H. SAXL.
ADJUSTABLE EXTENSION RAKE.
APPLICATION FILED JUNE 17, 1919.
1,372,558.
Patented Mar. 22, 1921.
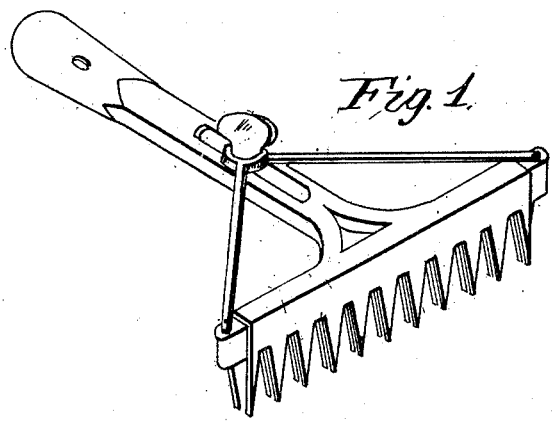
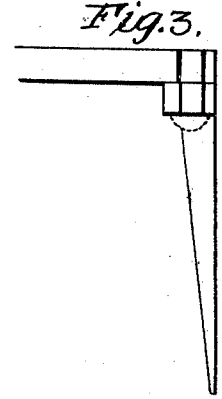
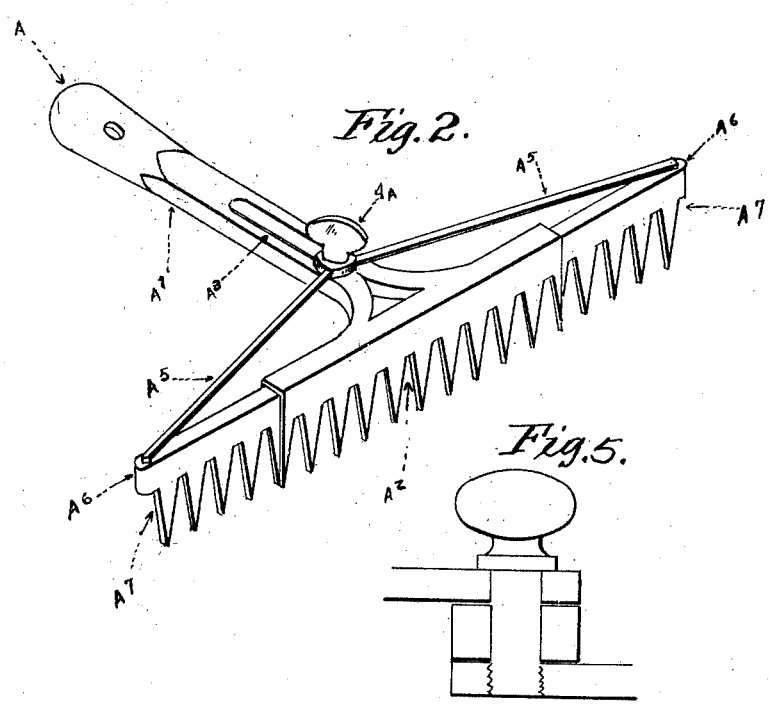
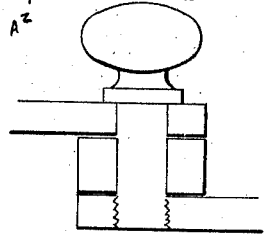
WITNESSES:
Louis E Marsh
V E Marsh
INVENTOR
Henry Saxl

UNITED STATES PATENT OFFICE.

HENRY SAXL, OF CAVE DALE, CALIFORNIA.

ADJUSTABLE EXTENSION-RAKE.

1,372,558.  Specification of Letters Patent.  Patented Mar. 22, 1921.

Application filed June 17, 1919. Serial No. 304,815.

*To all whom it may concern:*

Be it known that I, HENRY SAXL, a citizen of the United States, residing at Cave Dale, in the county of Sonoma, State of California, have invented new and useful Improvements in Adjustable Extension-Rakes, of which the following is a specification.

Appended hereto is a drawing to which reference will hereinafter be made and which shows the construction of the adjustable extension rake I have invented.

Referring to drawing:

(A) represents a sketch of the entire adjustable extension rake, consisting of various parts as hereinafter described and illustrated.

Figure 1 is a perspective view of the rake in retracted position, Fig. 2 is a similar view of the rake in extended position, Fig. 3 is a detail showing the connection between the supplemental rake head and the brace, Fig. 4 is a cross section of the main rake head, and Fig. 5 is a detail showing the means for locking the braces in adjusted position relative to the handle.

($A^1$) represents the handle of the device fastened to the center portion of rake ($A^2$). In the handle of this rake ($A^3$) is a slot containing a sliding bolt ($A^4$), and fastened to said sliding bolt are the two arms or braces ($A^5$ and $A^5$). Said two arms or braces ($A^5$ and $A^5$), are pivoted in any suitable manner ($A^6$ and $A^6$) to the extension pieces of said rake, ($A^7$ and $A^7$). The said extension pieces ($A^7$ and $A^7$) slide lengthwise in a groove along side of the center section of said rake.

The operation of this rake is as follows: In sliding the two movable sections of this rake ($A^7$ and $A^7$), into the length required, this movement will be followed by the two arms or braces, ($A^5$ and $A^5$) and the bolt ($A^4$) so that when the said bolt ($A^4$) has been tightened, the entire rake will remain fixed and permanent at the required length to which it has been adjusted.

This rake can be made in different sizes, shapes and designs to suit various purposes where an adjustable extension rake is needed.

What I claim is:

An adjustable extension rake comprising a handle, a rake head secured thereto, supplemental rake heads mounted to slide longitudinally of said first mentioned rake head, a pivot element mounted to slide longitudinally of said handle, means for locking said pivot element in adjusted position, and braces connecting the outer ends of said supplemental rake heads to said pivot element.

In testimony whereof I affix my signature in the presence of two witnesses.

HENRY SAXL.

Witnesses:
LOUIS E. MARSH,
V. E. MARSH.